March 18, 1969  N. J. COGELIA ET AL  3,433,884
ELECTRICAL WIRE STRUCTURE
Filed Feb. 1, 1967

INVENTORS: N. J. COGELIA
S. M. MARTIN
R. B. RAMSEY

BY: Charles E. Graves
ATTORNEY

United States Patent Office 3,433,884
Patented Mar. 18, 1969

3,433,884
ELECTRICAL WIRE STRUCTURE
Nicholas J. Cogelia, Baltimore, Samuel M. Martin, Lutherville-Timonium, and Raymond B. Ramsey, Towson, Md.; said Martin assignor to Western Electric Company, Incorporated, New York, N.Y., a corporation of New York, and said Cogelia and said Ramsey assignors to Bell Telephone Laboratories, Incorporated, Murray Hill, N.J., a corporation of New York
Filed Feb. 1, 1967, Ser. No. 613,188
U.S. Cl. 174—49                     13 Claims
Int. Cl. H02g 3/04; H01b 7/00

ABSTRACT OF THE DISCLOSURE

A distribution panel and plural telephone stations are connected by wires contained in building conduits. The wires in the conduit have a resin jacket which includes a lubricant. The lubricant together with the jacket formulation reduce the wire-to-wire and wire-to-conduit frictional forces. The conductors are annealed copper of a reduced gauge. This wire structure requires substantially less pulling force when being installed in the conduit.

---

This invention relates generally to an improved wire structure for effecting electrical connections between an outside signal or power source and items of apparatus inside a building. For purposes of illustration, the invention is hereinbelow described principally in terms of a novel telephone station wire structure that greatly facilitates installation of wire in the conduits, pipes and other wire housings within the building.

Telephone station wire provides the electrical interconnection on a customer's premises between his station set, for example, and a remote connection point to the nearby distribution panel. A typical station wire comprises a number of individually insulated copper-steel conductors surrounded by a protective outer jacket. The latter usually is composed of a polyvinyl chloride compound. In office buildings, factories and other large complexes, station wire is led from connecting panels on the same or a nearby floor via ducting of some sort to the location of the telephones being served. These ducts include vertical conduits or raceways of concrete or ceramic, or occasionally plastic or metal pipes; and also under-floor horizontal metal conduits. In smaller installations, such as private homes, the station wire is often installed simply through holes in floor joists or suspended from drive rings spaced at intervals along a wall or ceiling.

Placing of station wire in any of these environments most often entails manually threading or fishing the station wire through the long and usually devious pipe or conduit sections. The practice calls for one workman stationed at one end of a pipe section to force a metal fishtape through and out the other end where a second workman attaches a length of station wire to the tape. The first workman then pulls the fishtape with the attached station wire back through the conduit. In this fashion, up to a score or more of station wires are placed in the pipe. Often it is later desirable—although not always possible—to add still more station wires in the same pipe.

While ostensibly a simple enough task, in fact telephone station wire installation has been and is inordinately costly and time-consuming.

For example, in order to withstand the manual pulling forces imposed during installation, the station wire conductor has had to be strengthened through the use of 20 AWG (0.032″) copper-steel conductor. A copper-steel conductor, however, is much stiffer than a conductor of solid copper; and thus more pulling force is necessary to draw this wire through the conduit. Increased pulling forces also are necessary when—as is often the case—the pipe has several elbows, or is already occupied by other station wires. Additionally, the jacket-to-jacket and jacket-to-pipe frictional retarding forces play a large role in establishing the pulling force required to install a given station wire.

For this relatively small wire, the pulling force required on installation is surprisingly large. Even special lubricants applied to the wire and pipe often do not reduce the retarding forces enough to enable just one man to tug the wire through. The breaking strength of the station wire ultimately limits the maximum appliable pulling force. This upper limit, however, often is below the force necessary to pull the wire through many pipes routinely worked by the installers.

Beginning at a surprisingly low pipe utilization level, the forces resisting pull-through of an additional wire rise quite rapidly toward the wire's breaking point. As a result, often far fewer station wires can be placed in a given pipe than it could physically accommodate. In such a case, it not infrequently is necessary first to remove some of the existing wires from the pipe in order to facilitate placement of the fishtape and then install added station wires. Not only is still more time thus consumed but, of course, the services furnished by the existing wires are disrupted.

Currently, almost a billion linear feet of station wire are installed annually; and the problems noted above thus are of substantial concern. But in addition, the same set of problems must be confronted in the installation of so-called inside wiring cable. These are multipair jacketed cables running in groups from a main connection panel in a basement, for example, through vertical conduits to floor distributing panels.

Attempts to solve these installation problems have been limited, insofar as is known, to experimentations with increased conductor size and with various forms of applied external lubricants. Neither of these approaches has yielded solutions. Increased conductor size brings with it additional stiffness that more than offsets in most cases its added strength. As it is, the gauge size of conventional station wire, for example, already is too large to lend itself readily to the now widely-used "quick connectors." Moreover, many of the lubricants considered, and some of those currently used, have an initially deleterious effect on the electrical characteristics of the wire, such as mutual capacitance; and of course represent still further labor and material costs.

Accordingly, a primary object of the invention is to reduce the cost of installation of indoor telephone wiring.

Another object of the invention is to reduce the pulling force necessary to install station wire in conduits, pipes and other holders.

An added object of the invention is to increase the number of such wires that can be installed in these vehicles.

These and other objects are accomplished in accordance with the invention, broadly, by employing a certain optimal resin-to-plasticizer ratio in the outer jacket formulation and in the case of station wire, by employing annealed copper conductors of a reduced gauge size in place of the copper-steel conductors earlier used in station wire. Advantageously, a petroleum wax lubricant is added to the outer jacket compound to obviate the need for externally applied lubricants applied heretofore during installation. Of further importance is the use of pelletized compounds in the process of extruding the outer jacket followed by an open trough cooling step.

The pulling forces required to install station wire produced in accordance with this invention are a small fraction of those required to install earlier types of station wire under comparable conditions. Further, in a given size and length of pipe where heretofore no amount of force and lubricant would avail to install 10 station wires, for example, it is now possible to install on the order of twice that number with an average force within the capability of one man. Additionally, even where substantially more of the new wires are placed in a single pipe than heretofore was possible, no external lubricant is necessary. A further advantage of the invention is that since a lighter gauge wire now suffices, a sizable savings in material cost results.

Most importantly, it has been found that the labor costs incurred in installing station wire produced in accordance with this invention are far less than those for installing a comparable quantity of the conventional station wire heretofore used.

Other objects, features and advantages of the invention will become apparent from the detailed description to follow of an illustrative embodiment thereof and in the drawing in which.

Figure 1:
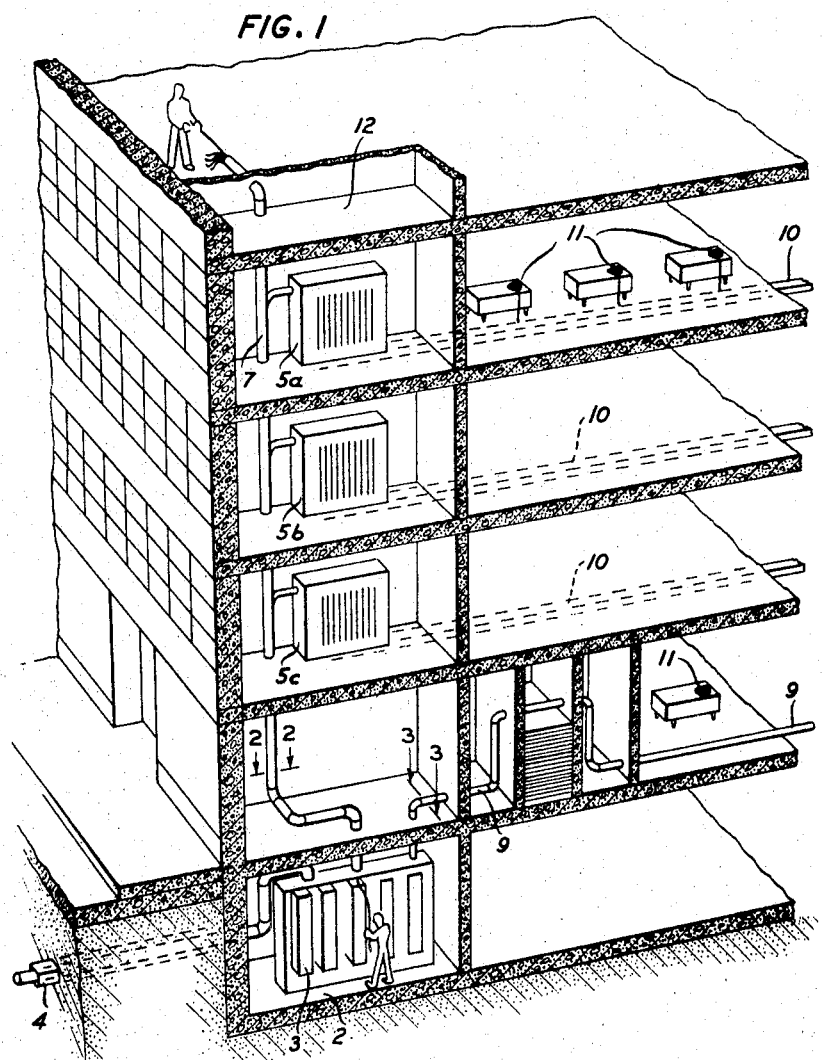
FIG. 1 is a sketch of a typical use environment.

FIG. 1 is illustrative of a typical environment in which telephone station wire and inside wiring cable are installed. Designated as 1 is an office or apartment building or the like, which has a telephone cable vault 2 housing a conventional multiconnection terminal board 3. The inputs to terminal board 3 are the conductor pairs of distribution cable 4 which leads ultimately to a central office.

Figure 2:
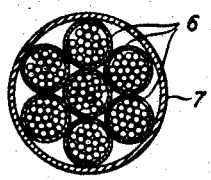
FIGS. 2–4 are schematic cross sectional views of ducts and wires employing the invention.
Figure 3:
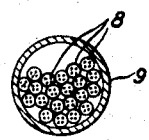
Figure 4:
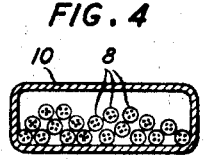

Normally, connections are provided between basement terminal board 3 and the several floor distribution boards, designated 5a, 5b, 5c, by inside wiring cables 6 in vertical conduit 7. FIG. 2 is a cross sectional view of conduit 7 showing therein several inside wiring cables 6. Each such cable 6 typically comprises 25 or so separate, insulated conductor pairs enclosed in an outer jacket of a polyvinyl chloride compound. In smaller installations, individual station wires may be run from terminal board 3 directly to items of equipment, as for example, the several station wires designated 8 located in conduit 9 and shown in FIG. 3. Additionally, in most installations, station wire, such as 8, is run from each distribution board on a given floor, such as board 5a, through metal conduit such as 10, shown cross sectionally in FIG. 4, directly to equipment such as telephones 11. Occasionally, station wires 8 are led through the spaces above a dropped ceiling (not shown); and in most private one- and two-family homes are led through a succession of holes in floor joists.

Installation of inside wiring cable between vault 2 and remote eve 12, for example, typically calls for one man at level 12 to introduce a fishtape (not shown) down through conduit 7 and out its lower end in vault 2 where a second man receives it and attaches a cable thereto. In the usual case where a number of cables already occupy conduit 7, past practice also has called for lubricating the cable as it is fed up through conduit 7. A similar procedure involving two men is required to install station wire between, for example, distribution board 5a and telephones 11 and beyond.

Prior art station wires such as 8 typically comprise two, three or four copper-steel conductors, each individually insulated, and all enclosed in an outer jacket. As earlier noted, this steel content has been required to increase the breaking strength, and severely stiffens the wire. A widely-used station wire of the prior art, for comparison with the inventive wire about to be described, comprises four 20 AWG (0.032″) copper-steel conductors each individually insulated with a .010 to .012 inch thick coating of polyvinyl chloride compound. A .001 inch thick paper tape is applied longitudinally with a lapped seam between the spiral quad and a .018 inch thick polyvinyl chloride jacket.

Figure 5:
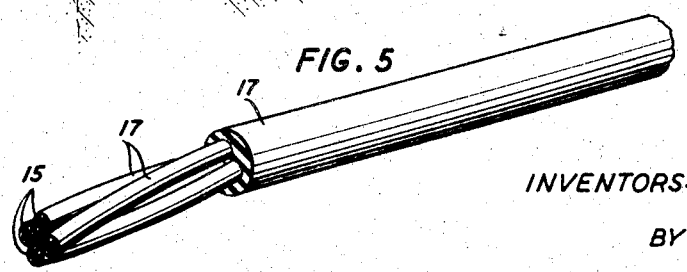
FIG. 5 is a perspective view of a specific station wire.

As shown generally in FIG. 5, the novel station wire of the present invention comprises four 22 AWG annealed copper conductors 15, each individually insulated preferably with a .006 to .008 inch thick coating 16 of a high density polyethylene compound. The individual wires 15 in this instance are twisted in a spiral quad form. The outed jacket 17, in accordance with one facet of the invention, is compounded of ingredients having the following parts by weight:

| | Parts by weight |
|---|---|
| Poly (vinyl chloride) resin—GP5–00003 | 100.0 |
| Di-2-ethylhexyl-O-phthalate (plasticizer) | 47.0 |
| Dyphos (dibasic lead phosphate) | 7.0 |
| Calcium carbonate ($CaCO_3$) | 7.0 |
| Titanium dioxide ($TiO_2$ coated) | 5.0 |
| Petroleum wax | 1.0 |

The actual diameter of each annealed copper conductor 15 preferably is in the range of from 24.5 to 25.3 mils. The wall thickness of outer jacket 17 is in the range from .015 to .018 mil; and the finished wire is approximately circular in cross section and 0.145 inch in diameter. Significantly, this diameter is approximately 20% less than earlier station wire performing the same function.

The polyvinyl chloride resin GP5–00003 is formulated in accordance with ASTM D–1755–66T. This formulation is found in the ASTM Book of Standards, part 26, issue of 1966, published by the American Society for Testing and Materials. As stated therein, the relevant properties of polyvinyl chloride resin grade GP5–00003 are that its dilute solution viscosity is in the range 1.00 to 1.15; and that its maximum conductivity in micromhos per centimeter per gram is 6. Other resins are suitable substitutes, provided the resin-to-plasticizer ratio of 100:47 is maintained. These are all 100% vinyl chloride polymers of substantially the same molecular weight as GP5–00003.

The plasticizer mentioned above is itself conventional, but the resin-to-plasticizer ratio of 100:47 has been found optimally effective in minimizing the frictional properties of outer jackets formed thereof, especially the coefficient of sliding friction. Other generally suitable plasticizers include n octyl dicyl and disodicyl.

The function of Dyphos is twofold: it is a hydrogen chloride scavenger and also an ultraviolet light screen. It thus lends weather resistant properties to outer jacket 17. The calcium carbonate is used as an extender to reduce costs. There are acceptable substitutes for it, including some clays known in the art. The titanium dioxide is employed as a further weatherizer to reduce the ultraviolet light penetration when the station wire is used out-of-doors. The petroleum wax advantageously is a paraffin base wax which provides both internal and external lubrication for outer jacket 17. Pure paraffin is an acceptable wax.

One suitable calcium carbonate additive is available under the name Atomite Whiting; the titanium dioxide used was Titanox Ranc; and the petroleum wax was Aristowax No. 165.

The method of making station wire such as described above and pictured in FIG. 5 involves conventional wire-producing machinery and extrusion techniques with however, a significant variation. In general, the ingredients of outer jacket 17 may be fed into a conventional extruder in pellet, powder or granule form. After the extrusion of the outer jacket over the insulated conductors, the wire is cooled. If the ingredients were in powder form, the extruded outer jacket is somewhat porous and pressure tube cooling is employed to reduce the porosity. If pelletized compounds were used, however, the jacket is not unduly porous and hence an open trough cooling step suffices. It has been found, however, that an outer jacket produced with the above-described formulation supplied in pellet form and thereafter subjected to open trough cooling exhibits still lower surface friction characteristics than does the jacket produced from powder compounds that subsequently are pressure tube cooled. Hence, in the pre-preferred embodiment of the invention, a pelletized form of compound is used in conjunction with open trough cooling.

The advantages of station wire produced in accordance with the invention are sevenfold. Its flexibility, tracing to the annealed copper conductors, is substantially greater than known prior art station wires built to withstand large pulling forces. As a consequence, much less of the applied pulling energy is dissipated in merely bending the wire through the various elbows depicted in FIG. 1. It follows that less total force is necessary in installing each wire. Further, whereas the minimum breaking strength of each copper-steel conductor of prior art station wire of similar configuration had to be approximately 44 pounds to make possible a given pull-through, the breaking strength of each pure copper conductor 15 when enclosed in outer jacket 17 produced pursuant to the above teachings need to be no more than 14 pounds each. The reduction in pulling force realizable by the novel outer jacket 17 thus permits use of a smaller gauge, lighter and, importantly, much more flexible conductor material in place of the copper-steel earlier used. As earlier noted, these advantages result in very sizeable savings in installation costs.

Laboratory tests were made to simulate the behavior of different outer jacket materials under their actual installation conditions. Such tests take into account—for a given pipe size, length and configuration—how many wires can be placed and what the average necessary pulling force is for a given speed of advance. The frictional forces include wire-to-wire friction between wires of the same type, wire-to-aluminum friction, and wire-to-wire friction between wires of different type outer jackets. The tests were conducted on station wires similar except for the outer jackets which employed, respectively, the inventive formulation extruded from pellets and open-trough cooling, the inventive formulation extended from powder and pressure tube cooling, and finally a representative prior art powder formulation characterized by a resin-to-plasticizer ratio of 100:65 which underwent pressure tube cooling. The prior art wire had four 20 AWG copper-steel conductors instead of four 22 AWG annealed copper conductors. A brief summary of the test results follows.

The laboratory tests reflecting wire-to-wire retardant forces indicate that regardless of the percent fill the inventive wire always requires substantially less pulling force than the prior art wire under the same conditions of fill. At the higher rate of advance (10 feet/minute vs. 2 feet/minute), where at moderate fill percents the older wire actually breaks, the new wire can be pulled through with lower forces and without breaking. This comparison indicates the value of the new wire where a pipe is already largely filled. Still more new wire can be installed and at a goodly rate without disturbing connections and without it breaking.

Tests of the wire-to-metal retardant forces showed the relative difficulty of installation owing to drag forces between the metallic pipe and the three different wires, again at different fill levels and at different speeds of advance. The same degree of superiority was exhibited by the inventive new wire, regardless of speed of advance and of percent previous fill.

Actual duct tests were also conducted on the three types of station wire. In a given duct, an average of 7 prior art wires were placeable, using an average pulling force in excess of 75 pounds. In contrast, about 20 wires jacketed with the inventive formulation prepared from powder and subsequently pressure tube cooled were placed with an average pulling force of only 28.7 pounds. More important still, about 23 wires jacketed with the inventive formulation prepared from pellets and subsequently open trough cooled were placed with an average pulling force of 21.7 pounds. The greater outer jacket surface roughness, resulting from the use of pellets and open trough cooling, accounts for the superiority of the latter outer jacket over the jacket prepared from powder. In both cases, however, the basic inventive outer jacket formulation in conjunction with smaller gauge annealed copper conductors was a combination superior in duct placement characteristics of the earlier wire.

It is obvious that the basic inventive idea herein illustrated primarily with respect to telephone station wire is equally applicable to electrical power conductors which routinely are led through piping in the described fashion. Also, the basic outer jacket formulation is equally applicable with stranded copper conductors, or on telephone cordage using tinsel conductors. The jacket may be used also on other solid conductors such as aluminum and on cadmium copper. For most applications, the aluminum would have to be two guage sizes larger than the annealed copper in the station wire described above, in order that the wire have equivalent strength.

It is to be understood that the embodiments described herein are merely illustrative of the principles of the invention. Various modifications may be made thereto by persons skilled in the art without departing from the spirit and scope of the invention.

What is claimed is:

1. An electrical cable comprising:
    a plurality of annealed copper conductors;
    an insulative sheath surrounding each said conductor; and
    an extruded outer jacket comprising substantially the following parts by weight: 100 parts of 100% vinyl-chloride polymer resin; 47 parts of a plasticizer selected from the group consisting of di-2-ethylhexyl-O-phthalate, n octyl dicyl and diisodecyl phthalate; 7 parts of dibasic lead phosphate; 7 parts of calcium carbonate; and 5 parts titanium dioxide.

2. A cable in accordance with claim 1, wherein said resin has a dilute solution viscosity in the range 1.00 to 1.15 and a maximum conductivity of 6 micromhos per centimeter per gram.

3. A cable in accordance with claim 2, wherein said plasticizer comprises di-2-ethylhexyl-O-phthalate.

4. A cable in accordance with claim 3 wherein said outer jacket further comprises 1 part petroleum wax.

5. A cable in accordance with claim 4 wherein said petroleum wax comprises paraffin.

6. A telephone station wire comprising:
    a plurality not exceeding four of annealed copper conductors, each having a diameter in the range from 24.5 mils to 25.3 mils;
    a high density polyethylene insulation on each said conductor, said insulation having a wall thickness in the range from 6 mils to 8 mils; and
    an extruded outer jacket over said conductors, said jacket comprising by weight 100 parts polyvinyl chloride resin, 47 parts di-2-ethylhexyl-O-phthalate plasticizer, 7 parts dibasic lead phosphate, 7 parts calcium carbonate and 5 parts titanium oxide.

7. A telephone station wire in accordance with claim 6 wherein said jacket further comprises 1 part by weight of a petroleum wax.

8. A telephone station wire in accordance with claim 7 wherein said petroleum wax is paraffin.

9. A telephone station wire in accordance with claim 8 wherein the wall thickness of said jacket is in the range from 15 mils to 18 mils.

10. Electrical interconnections within a building between a distribution panel and plural telephone stations comprising:
    conduit running a substantial fraction of the distance between said panel and said stations, said conduit comprising a continuous, substantially relatively inaccessible closure; and
    a plurality of telephone station wires connected between said panel and said stations and running in said conduit, each said wire comprising from 2 to 4 annealed copper conductors each having a diameter in the range from 24.5 mils to 25.3 mils, a high density polyethylene insulation coated on each said conductor, said insulation having a wall thickness in the range from 6 mils to 8 mils, and an extruded outer jacket over said conductors, said jacket comprising by weight 100 parts polyvinyl chloride resin, 47 parts di-2-ethylhexyl-O-phthalate plasticizer, 7 parts dibasic lead phosphate, 7 parts calcium carbonate and 5 parts titanium oxide, the overall diameter of each said station wire not exceeding 150 mils.

11. Apparatus in accordance with claim 10 wherein said jacket further comprises 1 part by weight of a petroleum wax.

12. Apparatus in accordance with claim 11 wherein said petroleum wax is paraffin.

13. Electrical interconnections within a building between a distribution panel and plural telephone stations comprising:
   conduit running a substantial fraction of the distance between said panel and said stations, said conduit comprising a continuous, substantially relatively inaccessible closure; and
   a plurality of telephone station wires connected between said panel and said stations and running in said conduit, each said wire comprising from 2 to 4 aluminum conductors each having a diameter in the range from 24.5 mils to 25.3 mils, a high density polyethylene insulation coated on each said conductor, said insulation having a wall thickness in the range from 6 mils to 8 mils, and an extruded outer jacket over said conductors, said jacket comprising by weight 100 parts polyvinyl chloride resin, 47 parts di-2-ethylhexyl-O-phthalate plasticizer, 7 parts dibasic lead phosphate, 7 parts calcium carbonate and 5 parts titanium oxide, the overall diameter of each said station wire not exceeding 150 mils.

References Cited
UNITED STATES PATENTS

| | | | |
|---|---|---|---|
| 2,321,415 | 6/1943 | Peltz | 174—49 X |
| 2,349,413 | 5/1944 | Hemperly. | |
| 2,708,215 | 5/1955 | Kaganoff | 174—110 |
| 3,209,064 | 8/1965 | Cutler | 174—113 X |

LEWIS H. MYERS, *Primary Examiner.*

ELLIOT GOLDBERG, *Assistant Examiner.*

U.S. Cl. X.R.

174—110, 113